May 24, 1955     A. GOULD     2,709,057
CONSTANT LOAD SUPPORT
Filed April 10, 1950     5 Sheets-Sheet 1

INVENTOR.
ARTHUR GOULD
BY
ATTORNEYS

May 24, 1955　　　A. GOULD　　　2,709,057
CONSTANT LOAD SUPPORT
Filed April 10, 1950　　　　　　　　5 Sheets-Sheet 2
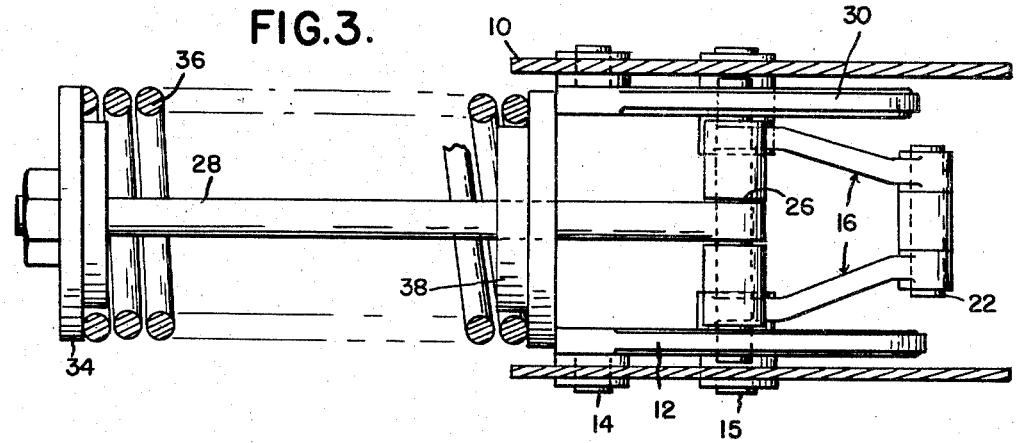
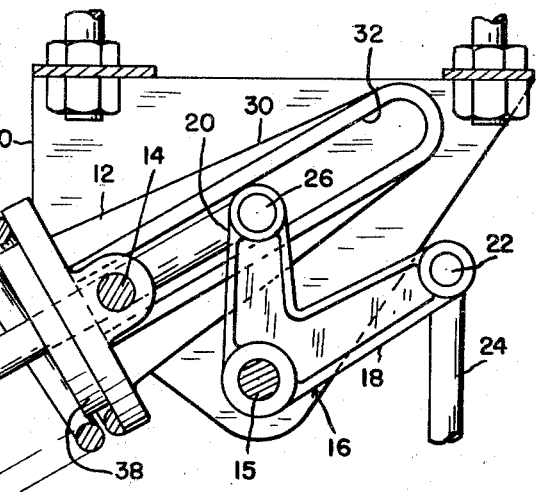
INVENTOR.
ARTHUR GOULD
BY
ATTORNEYS May 24, 1955  A. GOULD  2,709,057
CONSTANT LOAD SUPPORT
Filed April 10, 1950  5 Sheets-Sheet 3

INVENTOR.
ARTHUR GOULD
BY Whittemore
Hulbert & Belknap
ATTORNEYS

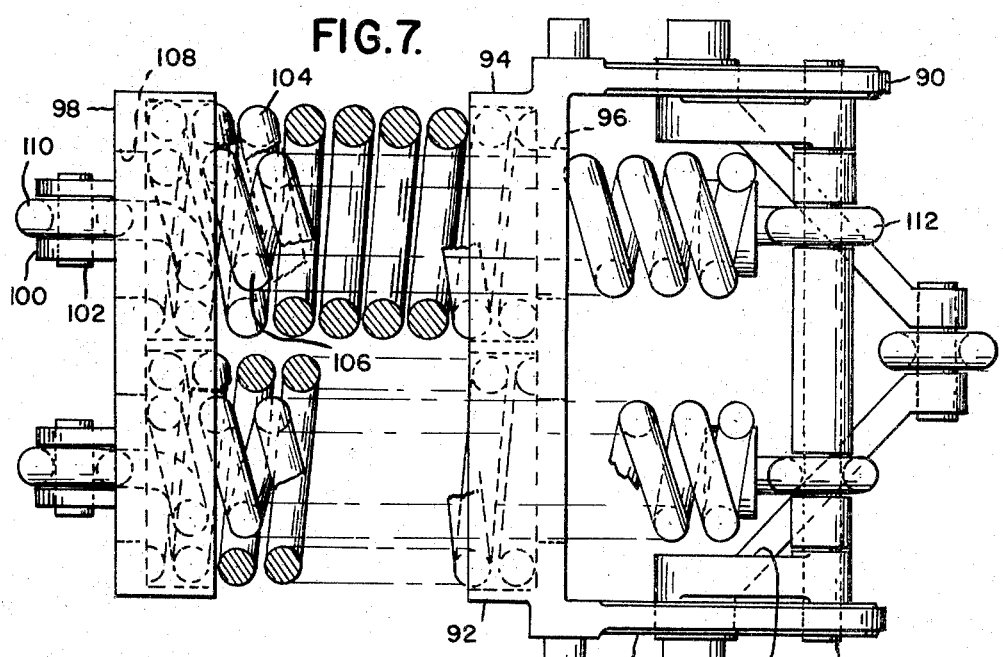
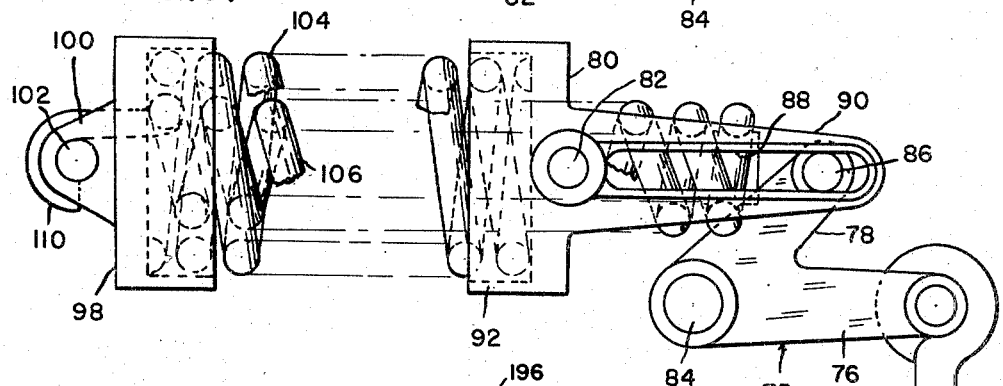
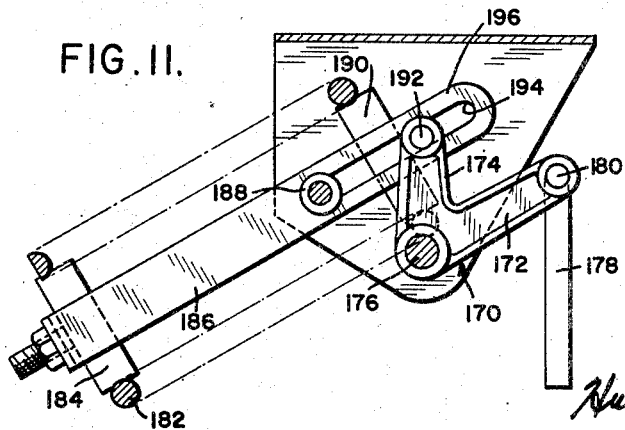

INVENTOR.
ARTHUR GOULD
BY Whittemore,
Hulbert & Belknap
ATTORNEYS

United States Patent Office 2,709,057
Patented May 24, 1955

2,709,057

CONSTANT LOAD SUPPORT

Arthur Gould, Detroit, Mich., assignor, by mesne assignments, to National Valve & Manufacturing Company, Pittsburgh, Pa., a corporation of Pennsylvania Application April 10, 1950, Serial No. 155,030

25 Claims. (Cl. 248—54)

The present invention relates to a constant load support.

An important application in the present invention is in supporting steel pipes or the like which are subject to very substantial expansion and contraction in use. The load supporting hangers disclosed herein may yield to accommodate either lateral or vertical movement of a section of pipe as a result of expansion or contraction and at the same time will contribute a uniform supporting force.

It is an object of the present invention to provide simplified constant load supports designed to provide a substantially constant load supporting force throughout substantial movement.

It is a further object of the present invention to provide constant load supports characterized by their simplicity, their efficiency in operation, and the economy with which they may be produced.

It is a further object of the present invention to provide constant load supports having means for adjusting the effectiveness of the supports.

It is a feature of the present invention to provide a constant load support including a bell crank having a load supporting arm and a balance arm in combination with spring balancing mechanism connected to the balance arm and mounted for rocking movement about an axis parallel to but spaced from the pivot axis of the bell crank.

It is a further feature of the present invention to provide a constant load support of the type described in the preceding paragraph in which the pivot axis of the spring balancing mechanism is angularly displaced from the vertical plane passing through the pivot axis of the bell crank by an angle substantially equal to the included angle between the arms of the bell crank.

Other objects and features of the invention will become apparent as the description proceeds, especially when taken in conjunction with the accompanying drawings, wherein:

Figure 2 is a vertical section through a constant load support of the type disclosed herein.

Figure 3 is a plan view of the constant load support or hanger disclosed in Figure 2.

Figure 6 is a side elevation of another modification of the present invention.

Figure 7 is a plan view of the support shown in Figure 6.

Figure 11 is a side elevation of yet another modification of the present invention.

Figure 1:
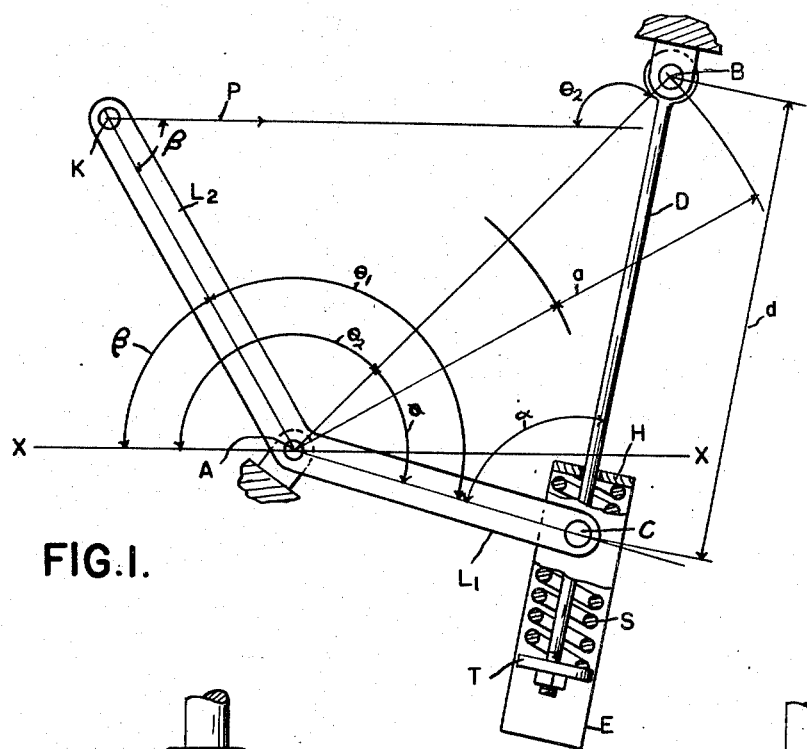
Figure 1 is a diagrammatic view used in connection with the mathematical explanation of the principles of the improved constant load mechanism.

Referring now to Figure 1 there is diagrammatically illustrated a constant load support or hanger which comprises a bell crank having a load supporting arm $L_2$ and a balance arm $L_1$. The bell crank is mounted for rocking movement about a fixed pivot A. Suitable connecting means having a pivot axis K are provided on the load supporting arm $L_2$ to connect this arm to a load to apply a force thereto in the direction of the arrow P. In order to counterbalance the torque by the load P on the load supporting arm $L_2$, a spring mechanism is provided which operates to set up a balancing torque on the balance arm $L_1$. The spring mechanism comprises a rod D mounted for rocking movement about a fixed pivot point B the axis of which is parallel to the axis of pivot A. At the outer end of the rod D is diagrammatically indicated a spring housing E having a head H through which the rod D extends, the head H constituting a seat for the compression spring S. At the outer end of the rod there is a spring seat T. The spring housing E is provided with ears by means of which it is pivotally connected about an axis C to the end of the balance arm $L_1$. As will be apparent from an inspection of the figure, torque applied by applying a load in the direction of arrow P to the load supporting arm $L_2$ tends to rotate the bell crank in a clockwise direction. This force is opposed by the compression spring S.

In order to provide a constant load supporting force throughout substantial displacement of the bell crank, certain mathematical conditions have to be fulfilled. In the first place it is assumed that the spring S has a substantially constant rate throughout its useful range. As will be subsequently described, the controlling consideration is the location of the pivot support B, which in turn is determined by the included angle between the arms $L_1$ and $L_2$ of the bell crank. Stated in general language, the requirement is that the pivot point B shall be located at a point such that a first plane containing the pivot axes A and B intersects a second plane containing the pivot axis A and parallel to the direction of the force P to be balanced at an angle $\theta_2$ which is equal to the included angle $\theta_1$ between arms $L_1$ and $L_2$.

In Figure 1 the dimension $a$ represents the distance of the point B beyond the arc obtained by the effective end of the balance arm $L_1$. The dimension $d$ represents instantaneous spring deflection and changes in the length of $d$ upon movement of the load supporting hanger result in proportional changes in the actual force exerted by the spring S along its line of action. The angle $\beta$ is the angle between the plane X—X passing through the pivot axis A of the bell crank and parallel to the direction of the applied load, and the centerline of the load supporting arm $L_2$. The same angle of course appears between the line of action of the load acting at the outer end of the load supporting arm $L_2$ and the arm itself. The angle $\alpha$ is the angle between the balance arm $L_1$ and the line of action of the load supporting spring S. The angle $\phi$ is the angle between the balance arm $L_1$ and the line joining pivots A and B. The angle $\theta_1$ is the included angle between the arms $L_1$ and $L_2$ of the bell crank. The angle $\theta_2$ is the angle between the plane X—X containing the axis A and parallel to the applied load, and the line joining the pivot connections A and B.

For any given set of conditions $L_1$, $L_2$, $a$, $\theta_1$ and $\theta_2$ are constant and the location of the pivots A and B is fixed.

If F equals the force exerted by the spring, then by taking a summation of moments about pivot A, the following equation may be set up:

$$FL_1 \sin \alpha = PL_2 \sin \beta$$

By trigonometry from the law of sines:

$$\frac{\sin \alpha}{(L_1+a)} = \frac{\sin \phi}{d}$$

where $d$ represents the spring deflection.

$$\therefore \sin \alpha = \frac{\sin \phi (L_1+a)}{d}$$

and $$\beta = \theta_2 + \phi - \theta_1$$

Substituting for $\sin \alpha$ and $\beta$ and solving for F, $$F = \frac{dPL_2 \sin (\theta_2+\phi-\theta_1)}{L_1(L_1+a) \sin \phi} \quad \text{(Equation I)}$$

In the foregoing general equation for the value of F, it will be observed that if $$\frac{\sin (\theta_2+\phi-\theta_1)}{\sin \phi} = 1$$

then F will vary directly with changes in the value of $d$. The foregoing is true when $\theta_2 = \theta_1$ in which case $$F = \frac{dPL_2}{L_1(L_1+a)} \quad \text{(Equation II)}$$

Referring again to Figure 1 it will be observed that $\theta_2$ is the angle between the plane indicated at X—X and the line joining the pivot axes A and B. Moreover, $\theta_1$ is the included angle between the arms $L_1$ and $L_2$ of the bell crank. Accordingly, in designing a constant load support in accordance with the present invention, it is necessary only to assume a definite included angle between the arms of the bell crank and thereafter to locate the pivot axis of the spring balancing mechanism in the appropriate position.

The actual spring employed in the construction is a helical coil spring, which may be either a tension spring or a compression spring. Springs of this type are available having a constant rate for the changes in length required.

A support based upon the above principles may have incorporated in its construction means for adjusting the value of the load P and still maintain the constant value for P throughout the range of travel of the bell crank. Load adjustment can be accomplished by any one of several methods. In the first place, it may be accomplished by changing the position of the pivot axis K along the arm $L_2$. It may also be effected by changing the position of the pivot axis C along the arm $L_1$. It may also be adjusted by changing the dimension $a$ so long as the pivot point B remains on the line AB. Finally, it may be adjusted by changing the spring constant.

From the foregoing mathematical analysis it will be observed that a limiting case is reached when the arms $L_1$ and $L_2$ are parallel or are in effect the same arm. In this case angles $\theta_1$ and $\theta_2$ are each zero which requires the pivot connection B to be located in the plane X—X passing through the axis A and parallel to the applied load. If the load is gravitational, this locates B directly above A.

Referring now to Figures 2 and 3 there is illustrated a practical embodiment of the present invention which is shown as positioned to support a vertical load, such as a weight. In this case the constant load support or hanger comprises a pair of frame plates 10 between which is mounted a spring guide 12, the spring guide 12 being mounted for rocking movement by pivot pins 14. Also mounted for rocking movement between the plates 10 on pivots indicated at 15 are a pair of bell cranks 16, each of which comprises a load supporting arm 18 and a balance arm 20. The outer ends of the arms 18 are interconnected by a pin 22 from which is suspended a load supporting rod 24. The outer ends of the balance arms 20 are also interconnected by a pin 26 to which is pivotally connected a rod 28 whose function will later be described.

The spring support 12 includes an elongated portion 30 having an elongated slot 32 in which are received the ends of the pin 26, thus establishing a guiding relation such that upon rocking movement of the bell crank 16, the spring guide 12 is automatically rocked therewith about the axis of its pivot mounting pin 14.

At the outer end of the rod 28 is a spring seat 34 and the compression spring 36 is seated between the spring seat 34 and a spring seat portion 38 on the spring guide 12. In the illustrated construction the spring 36 is a compression spring and it applies a force outwardly through the spring seat 34 to the rod 28 which acts on the pin 26 and exerts a counterclockwise torque on the bell crank 16.

In the embodiment of the invention illustrated in Figures 2 and 3 it will be observed that the included angle between the arms 18 and 20 of the bell crank is illustrated as 60 degrees. In order that this construction shall fulfill the mathematical requirements for a constant load support, the axis of the pin 14, which provides a pivot support for the spring balance mechanism, is therefore displaced angularly from the vertical plane passing through the axis of the pivot 15 by an amount equal to the included angle between the arms of the bell crank, or in this case 60 degrees. The distance between the axes of pins 14 and 26 corresponds to dimension $d$ in Fig. 1, and is always equal to the instantaneous value of the deflection of spring 36.

Figure 5:
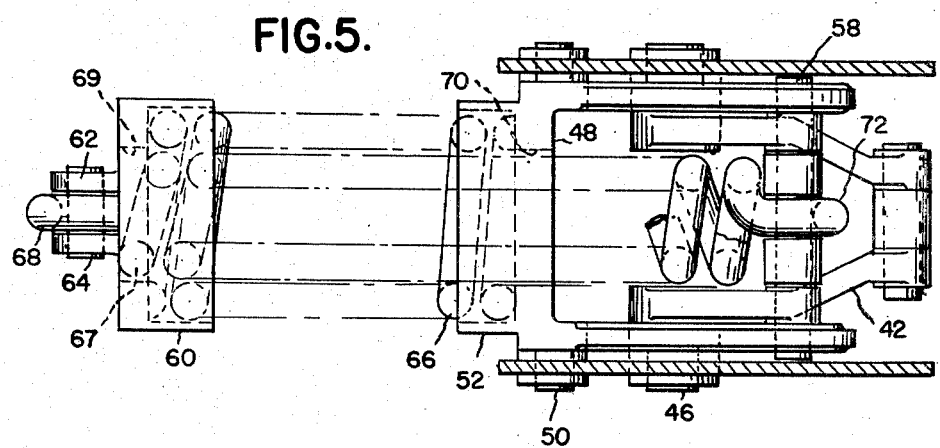
Figure 5 is a plan view partly in section of the constant load support shown in Figure 4.
Figure 4:
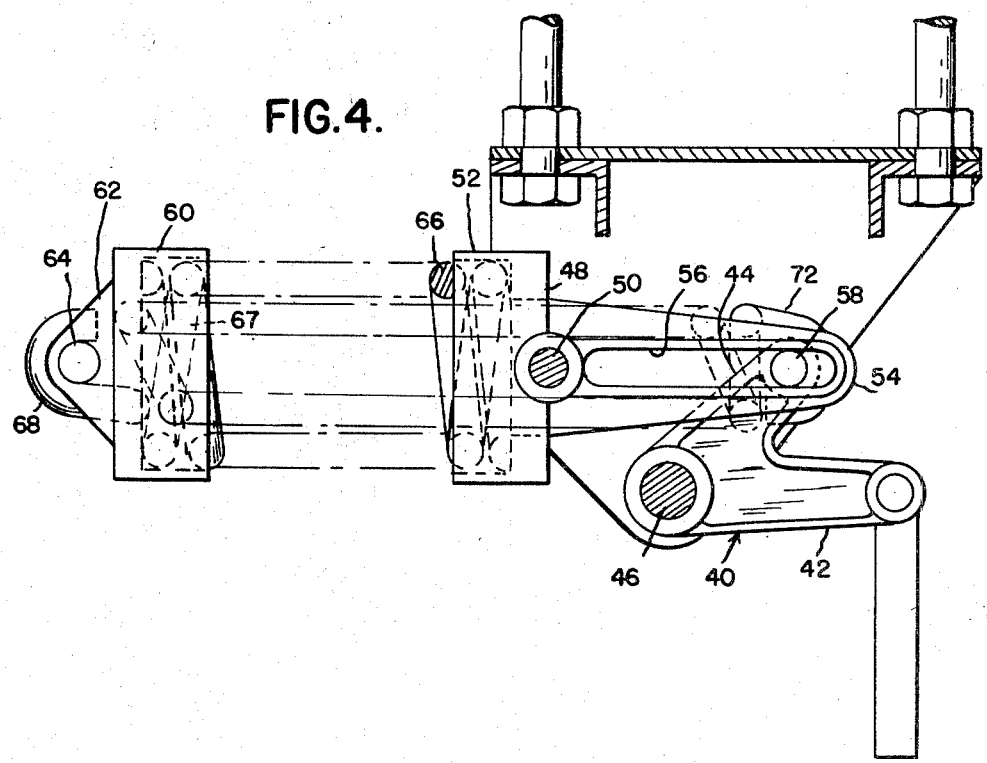
Figure 4 is a side elevation of a modified form of constant load support.

Referring now to Figures 4 and 5 there is illustrated another embodiment of the invention. In this case the bell crank 40 is illustrated as comprising a load supporting arm 42 and a balance arm 44 mounted for rocking movement about a fixed horizontal pivot 46. In this case the spring counterbalance mechanism comprises a spring guide 48 mounted for rocking movement about a fixed horizontal pivot 50 and including a spring seat portion 52 and a guide portion 54 having a guide slot 56 therein. The bell crank 40 includes a pin 58 having a portion or portions extending into the slot 56. An outer spring seat 60 is provided having ears 62 between which extends a pin 64. In the present construction a combination of a compression and a tension spring is employed and preferably the two springs are of opposite hand. The compression spring 66 seats at one end in the seat portion 52 of the spring guide 48 and at the other end in the outer spring seat member 60. The tension spring 67 extends through the compression spring, opening 69 in outer spring seat 60, and has a hooked end 68 engaged over the pin 64. At its opposite end the spring 67 extends through a central opening 70 formed in the spring guide and is provided with a hooked portion 72 at the opposite end which is engaged over the pin 58. The combination of the compression and tension springs is used to enable the mechanism to work in a minimum of space and otherwise the operation of the mechanism is precisely as previously described. Attention is directed to the fact that the included angle between the arms 42 and 44 is illustrated as 45 degrees. In order to carry out the teachings of the present invention the fixed pivot 50 is therefore located at an angular displacement of 45 degrees from the vertical plane passing through the axis of the pivot 46. The distance between the axes of pivots 50 and 58 corresponds to the dimension $d$ of Fig. 1 and is always equal to the deflection of the spring means.

Referring now to Figures 6 and 7 there is illustrated another embodiment of the present invention. In this case the bell crank as indicated at 75 is provided with a load supporting arm 76 and a balance arm 78 which may be substantially of the type previously disclosed. However, in this case a multiplicity of sets of springs are employed as best seen in Figure 7. The spring guide 80 is provided with pivot ears 82 by means of which it is mounted for rocking movement about a stationary pivot axis parallel to the axis of the pivot support 84 provided for the bell crank 75. The balance arms 78 of the bell crank are interconnected by a transversely extending pivot pin 86 which extends through slots 88 formed in the laterally extending guide members 90 of the spring guide 80. The spring guide is provided with a pair of spring seats 92 and 94, each of which has an aligned opening 96 provided thereat. A nouter spring seat member 98 is provided having a pair of pin supporting ears 100, each of which is provided with a spring engaging pin 102. In this case two helical compression springs 104 are provided which seat at opposite ends respectively in spring seat portions 94 of the spring guide 80 and in spring seats 98. The tension springs 106 are provided which extend through the openings 108 adjacent to the ears 100 and have hooked ends 110 engaging over the pins 102. At their opposite ends the tension springs 106 pass through the openings 96 provided in the spring guide 80 and have hooked portions 112 which engage over the pin 86.

In this case the parts are designed to fulfill the mathematical requirements previously set forth. It will be observed that the angle included between arms 76 and 78 is 45 degrees and the axis of the pivots 82 is displaced by an angle of 45 degrees from the vertical plane passing through the axis of the pivot 84. The distance between the axes of the pivot 82 and the pin 86 correspond to the dimension $d$ in Fig. 1 and is always equal to the deflection of the spring means.

Figure 9:
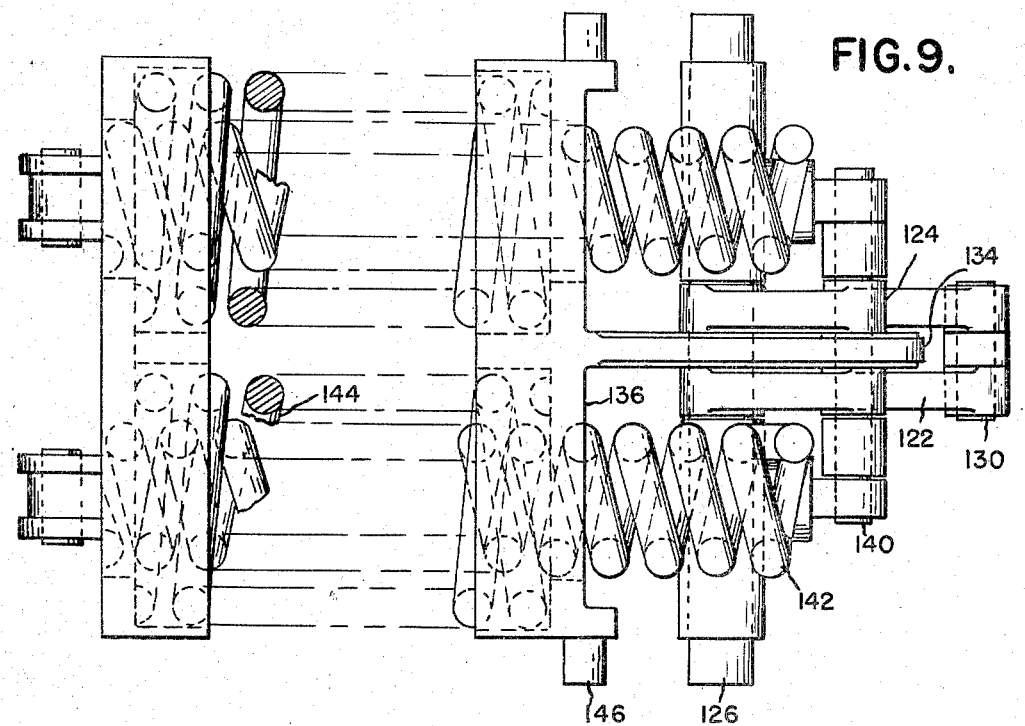
Figure 9 is a plan view of the support shown in Figure 8.
Figure 8:
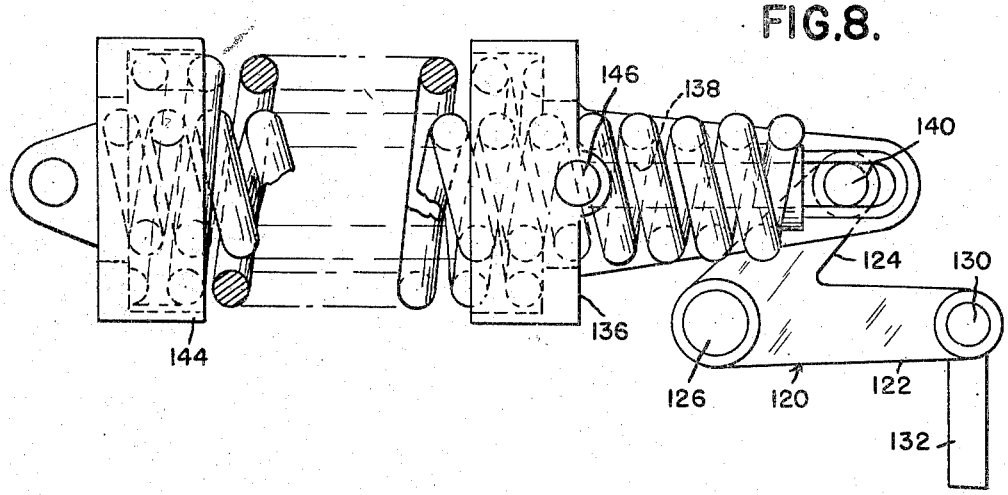
Figure 8 is a side elevation of yet another modification of the present invention.

Referring now to Figures 8 and 9 there is illustrated a slightly different embodiment. In this case the bell crank 120 is provided with a load supporting arm 122 and a balance arm 124. The bell crank 120 is mounted for movement about a fixed pivot 126. The load supporting arms 122 are interconnected by a pin 130 from which is suspended a load supporting rod 132. A pair of balance arms 124 are provided which are spaced apart to receive a single forwardly extending guide portion 134 of a spring guide 136. The guide portion 134 is slotted as indicated at 138 and a pin 140 extends through openings at the ends of the arms 124 and through the slot 138 of the guide portion 134. The pin 140 at opposite ends extends outwardly beyond arms 124 to provide means for connecting the tension spring 142 thereto. The relationship of the tension spring 142 to the enveloping compression springs 144 is precisely the same as disclosed in the previously described embodiment of the invention.

Again it will be noticed that the included angle between the arms 122 and 124 is 45 degrees and accordingly, in order to fulfill the requirements for a constant load hanger, the pivot support 146 of the spring guide 136 is located at an angle of 45 degrees from the vertical plane passing through the pivots 126. The distance between the axes of pin 140 and pivot support 146 corresponds to the dimension $d$ of Fig. 1 and is always equal to the deflection of the spring means.

Figure 10:
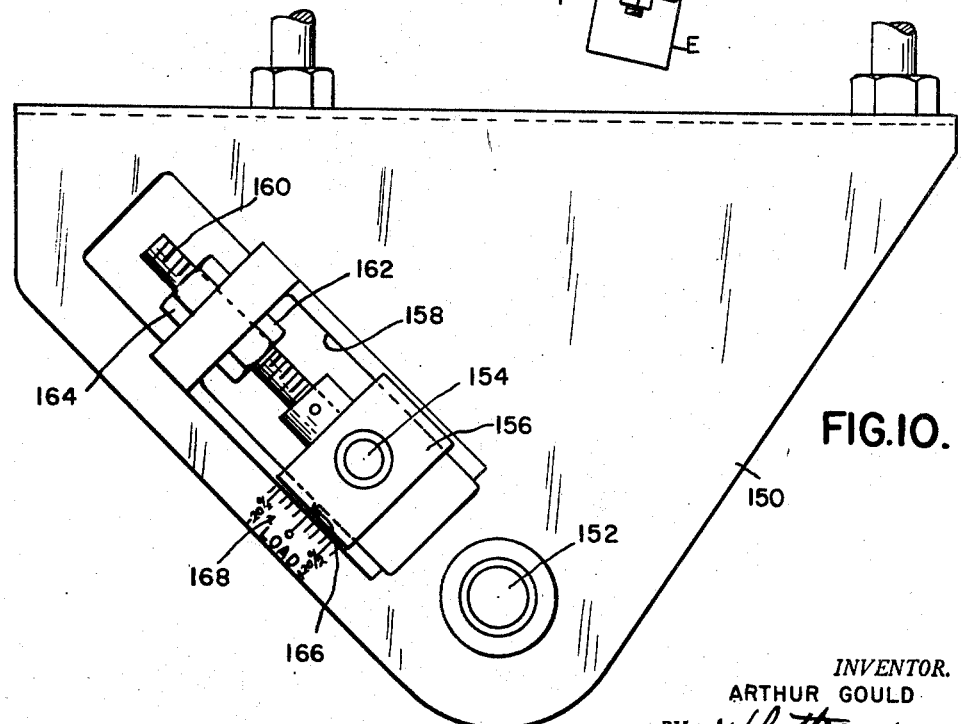
Figure 10 is a side elevation illustrating mechanism for adjusting the effectiveness of the support, a construction which is applicable to most of the several modifications disclosed herein.

Referring now to Figure 10 there is illustrated a mechanism for effecting adjustment of the effectiveness of the hanger. The view is a side elevation of a constant load support and shows one of the pair of plates 150 between which the bell crank and spring balancing mechanism is mounted. At 152 there is indicated a fixed pivot which in this instance will be the pivot connection for the bell crank. The pivot connection for the spring balancing mechanism is indicated as comprising trunnion ears or other types of pivots 154, which are mounted in adjustable blocks 156, these blocks being slidable along ways indicated at 158. It will be observed that the adjustment of the pivot connections 154 is toward and away from the axis of the pivot 152 so that it may be effected without disturbing the essential angular relation between these parts. Suitable means for effecting the adjustment is provided and is herein illustrated as comprising an adjusting bolt 160 and a pair of clamping nuts 162 an 164. A suitable indicator 166 is provided movable relative to a scale 168 which as illustrated indicates variations of plus or minus 20% in the load carried.

Referring now to Figure 11 there is illustrated another embodiment of the present invention. In this case the bell crank 170 is provided with a load supporting arm 172 and a balance arm 174. The bell crank 170 is mounted for rocking movement about a fixed pivot 176. A load supporting rod 178 is pivotally connected at 180 to the outer end of the load supporting arm 172.

In the present instance a tension spring 182 is employed having one end fixedly carried by a spring seat 184 carried at the outer end of a yoke 186. The yoke 186 constitutes the spring guide and is mounted for rocking movement about a stationary pivot 188. The opposite end of the tension spring 182 is engaged with a movable spring seat 190 having a suitable connection with a pivot 192 carried at the outer end of the balance arm 174. The pivot 192 preferably extends through or into an elongated slot or groove 194 provided in the guide portion 196 of the spring guide. Again, it will be apparent from an inspection of the figure that the included angle between the arms of the bell crank is 60 degrees. Accordingly, the pivot 188 is located at an angle of 60 degrees from the vertical plane passing through the pivot 176. The distance between the axes of pivots 188 and 192 corresponds to the dimension $d$ in Fig. 1 and is always equal to the instantaneous value of the deflection of spring 182.

In the present case reference is made to a load supporting arm and a balance arm. For simplicity these are shown as separate solid arms constituting lever means forming a bell crank. However, as employed in the claims, the term "arm" is used in its mathematical sense to refer to the torque producing lever arm extending from the common pivot axes of the two arms to the pivot connection between the load supporting arm and the load, or to the pivot connection between the balance arm and the spring balancing mechanism. Obviously, of course, these arms may be constituted in a single plate or the like, the lengths and angularity of the arms being determined by the location of the several pivot connections thereto.

While either a tension spring or a compression spring, or a combination of the two may be employed, it is desirable to employ at least one compression spring in the apparatus. This is for the reason that in the event of failure of the spring, the compression spring will merely collapse by an amount equal to the space between adjacent convolutions and accordingly, the section of pipe or other article supported thereby will be permitted to drop only a corresponding amount. On the other hand, where a tension spring is employed alone, failure of the spring may result in the load dropping an amount determined by the full capacity of the load supporting hanger.

While the present invention embodies a construction which in its preferred form depends upon satisfying the mathematical requirements for an accurate constant load support, it will be appreciated that many of the features of the constructions illustrated are novel and would contribute to utility of load supporting devices even though not designed to effect fully constant load supporting effectiveness throughout their range. Thus the features and arrangement of the parts which contribute to the simplicity of the present construction, as well as the economy of manufacture, the minimum amount of space required, and the facility for adjustment, inspection and upkeep, are features of the present invention.

For the purpose of simplifying the description, the devices disclosed herein have for the most part been illustrated as positioned to support a vertical load. This permits definition of planes and angles with reference to vertical and horizontal directions and simplifies the description. However, the invention is applicable to situations where constant force is to be applied to objects whose movement is within the limits of travel of the device, and the direction of this force may be in any direction. Its use in which the constant force developed is vertically upward is thus only a special case, although a useful one. It is to be understood that the description and claims are to be construed as including the structure independent of its orientation in space.

The drawings and the foregoing specification constitute a description of the improved constant load support in such full, clear, consise and exact terms as to enable any person skilled in the art to practice the invention, the scope of which is indicated by the appended claims.

What I claim as my invention is:

1. A constant load hanger comprising a load supporting arm mounted for rocking movement about a fixed axis, counterbalance means comprising helical spring means of substantially constant rate, a balance arm extending at an angle to said load supporting arm and connected to said spring means and mounted for rocking movement about said axis, means connecting said arms for equal angular movement, means pivotally mounting said spring means for rocking movement about a second fixed axis parallel to said first axis, means supporting one end of said spring means at a constant distance from said second axis, the other end of said spring being connected to said second arm, said second axis being located at a point such that a first plane containing both of said axes intersects a second plane containing said first axis and parallel to the direction of the load to be balanced at an angle substantially equal to the angle included between said arms.

2. A hanger as defined in claim 1 in which said arms are angularly related to form a bell crank.

3. A hanger as defined in claim 1 in which said spring means comprises a compression spring.

4. A hanger as defined in claim 1 in which said spring means comprises a tension spring.

5. A constant load hanger comprising a bell crank having a load supporting arm and a balance arm, means mounting said bell crank for rocking movement about a first axis, counterbalance mechanism connected to said balance arm comprising helical compression spring means, a first spring seat having an annular part shaped to receive one end of said spring means, a second spring seat engaging the opposite end of said spring means, a rod connected at its ends to said second seat and to said balance arm, means mounting said first seat for rocking movement about a second axis parallel to said first axis and located at a point such that a first plane containing both of said axes intersects a second plane containing said first axis and parallel to the direction of the force to be balanced at an angle substantially equal to the angle included between said arms.

6. A hanger as defined in claim 5 in which said first seat comprises a guide extending parallel to the line of action of said spring toward said balance arm, and guide means on said balance arm and guide effective to rock said counterbalance mechanism to maintain its line of action intersecting the connection between said rod and said balance arm.

7. A hanger as defined in claim 5 including means for adjusting the pivot axis of said counterbalance mechanism toward and away from the axis of said bell crank along a line passing through both of said axes.

8. A constant load hanger comprising spaced plates, a pair of bell cranks pivoted to said plates in spaced relation for rocking movement about a fixed axis, each of said bell cranks comprising a load supporting arm and a balance arm, a pin connecting the ends of said load supporting arms, load supporting means connected to said pin, a second pin connecting the ends of said balance arms, spring means connected at one end to said second pin, a spring guide mounted for rocking movement between said plates about a second fixed axis, said guide having a guide slot for receiving said second pin, and means supporting the other end of said spring means for rocking movement with said spring guide.

9. A hanger as defined in claim 8 in which said second axis is located such that a first plane containing both of said axes intersects a second plane containing said first axis and parallel to the direction of the force to be balanced at an angle substantially equal to the angle included between the arms of said bell cranks.

10. A constant load hanger comprising spaced plates, a spring guide having an annular guide and a pair of parallel slotted arms extending along the inner surfaces of said plates, means pivoting said guide to said plates about a horizontal axis, a pair of spaced bell cranks pivoted intermediate said plates, each of said bell cranks having a load supporting arm and a balance arm, load supporting means carried by said load supporting arms, a pin interconnecting the ends of said balance arms, said pin extending into the slots in said slotted arms, a spring connected to said pin and having its line of action passing through the opening in said annular guide, and means for supporting said spring for rocking movement with said spring guide.

11. A hanger as defined in claim 10 in which said spring is a helical compression spring seated at one end on said guide, and a rod connecting the other end of said spring to said pin, and passing through the opening in said annular guide.

12. A hanger for applying a substantially constant vertical support to a suspended load throughout a range of vertical movement of the load, said hanger comprising a support-engaging member, a load-engaging member disposed below said support-engaging member, a bracket attached to said support-engaging member and extending downwardly therefrom, a bellcrank having angularly disposed arms one of which extends laterally between said bracket and said load-engaging member and is pivotally attached to each on horizontally extending axes that are spaced from each other, a spring device including a link pivotally borne by said bracket and pivotally connected to the other arm on horizontal axes and including a spring acting between said link and said bracket to move the link axially thereof and with relation to the bracket in accordance with movements of said load-engaging member, the force of said spring on said link being the sole force applied to said bellcrank for supporting said load-engaging member and for exerting a uniform vertical pull thereon in variable vertical positions thereof, the point of pivotal connection of said link to said bracket being spaced laterally from the point of pivotal attachment of said bellcrank to said bracket, and the angle defined by two lines that extend through and intersect each other at the pivot axis of said bellcrank to said bracket and extend respectively through the pivot axis of said bellcrank to said load-engaging member and the pivot axis of said spring device to said bellcrank being the same as the angle between a vertical line extending through said pivot axis of said spring device to said bracket and a line extending through said last-named axis and through said pivot axis of said bellcrank to said bracket.

13. A hanger for applying a substantially constant vertical support to a suspended load throughout a range of vertical movement of the load, said hanger comprising a support-engaging member, a load-engaging member disposed below said support-engaging member, a bracket attached to said support-engaging member and extending downwardly therefrom, a bell crank having angularly disposed arms one of which extends laterally between said bracket and said load-engaging member and is pivotally attached to each on horizontally extending axes that are spaced from each other, spring means pivotally connecting said bracket and the other arm of said bell crank and acting between them to swing said bell crank on its pivotal connection to said bracket in accordance with vertical movements of said load-engaging member, the force of said spring means applied to said bell crank for supporting said load-engaging member exerting a uniform vertical pull thereon in variable vertical positions thereof, the point of pivotal engagement of said spring means by said bracket being spaced laterally from the point of pivotal attachment of said bell crank to said bracket, and the angle defined by two lines that extend through and intersect each other at the pivot axis of said bell crank to said bracket and extend respectively through the pivot axis of said bell crank to said load-engaging member and the pivotal engagement of said spring means by said bell crank being the same as the angle between a vertical line extending through the pivotal engagement of said spring means by said bracket and a line extending through said last-mentioned pivotal engagement and through the pivot axis of said bell crank to said bracket.

14. A spring support for exerting a constant supporting force on a load movable vertically within a limited range, which support comprises a frame, a lever pivoted thereon having arms angularly spaced apart about its pivot, means connecting the load to be supported to one arm of said lever so as to produce a turning moment about the lever pivot, oscillatable spring means mounted on a pivot on said frame, and means connecting one end of said spring means to a point on the other arm of said lever so as to produce a turning moment about the lever pivot equal to and opposed to the turning moment of the load; the distance between the axis of said spring pivot and the said point being equal to the deflection of the spring, and the said spring pivot lying on a line angularly spaced about the lever pivot from the vertical axis through the lever pivot by an amount equal to the angle between the said lever arms.

15. A spring support as defined in claim 14 in which the spring means pivotal mounting is adjustable along the said line toward or from the lever pivot.

16. A spring support for exerting a constant supporting force on a load movable vertically within a limited range which support comprises a frame, a lever pivoted on said frame having a pair of arms angularly spaced apart about the lever pivot, means connecting the load to be supported to one arm of said lever so as to produce a turning moment about the lever pivot which varies as the sine of the angle between said lever arm and the vertical axis through the lever pivot, oscillatable spring means pivotally mounted on said frame, and means connecting one end of said spring means to a point on the other arm of said lever so as to produce a turning moment about the lever pivot counterbalancing the turning moment produced by the load and which varies as the sine of the angle which said other arm makes with the line from the lever pivot to the spring pivot; the two above-mentioned angles being equal at any position of the load, the distance between the spring pivot and said point being always equal to the deflection of the spring means.

17. A spring support as defined in claim 16 in which the axis of the spring means is disposed in a substantially horizontal position when the load is midway of its limited range of movement.

18. A pipe support hanger comprising a frame, lever means, pivot means mounting said lever means on said frame for rotation about a first horizontal axis, said lever means having a load-supporting arm and a balance arm angularly displaced from said load-supporting arm about said first axis in a predetermined direction, counterbalance mechanism acting between said frame and said balance arm, said counterbalance mechanism comprising helical spring means having a straight line of action, pivot means connecting said counterbalance mechanism to said frame for rocking movement about a second horizontal axis parallel to said first axis and intersected by and perpendicular to the line of action of said spring means, pivot means connecting said counterbalance mechanism to said balance arm for rocking movement about a third horizontal axis parallel to said first and second axes and intersected by and perpendicular to the line of action of said spring means, said counterbalance mechanism comprising spring mounting means constructed and arranged to cause the deflection of said spring means to be equal to the distance between said second and third axes, said second axis being located at a point whose angular displacement about said first axis, from a vertical plane extending upwardly from said first axis, is the same in magnitude and direction as the displacement of said balance arm from said load-supporting arm.

19. A hanger as specified in claim 18 in which said counterbalance mechanism comprises a slotted member extending along the line of action of said spring means, one of said pivot means extending through the slot and being relatively slidable therein upon rocking of said lever means.

20. A hanger as specified in claim 18 in which the angular displacement between the arms of said lever means is selected to cause said spring means to have its line of action generally horizontal during movement of said balance arm within its normal range.

21. A hanger as specified in claim 18 in which the angular displacement between the arms of said lever means is an acute angle selected to cause said spring means to have its line of action generally horizontal during movement of said balance arm within its normal range.

22. A constant load support comprising a bell crank having a load supporting arm and a balance arm angularly disposed thereto, means mounting said bell crank for rocking movement about a first fixed axis, counterbalance mechanism comprising a spring assembly connected to said balance arm, and guide means carried in part by said balance arm and in part by said spring assembly to rock said spring assembly about a second fixed axis spaced from but parallel to said first axis in accordance with rocking movement of said bell crank, said guide means comprising a slotted member forming a part of said spring assembly, and an element carried by said balance arm slidable in the slot of said slotted member.

23. A constant load support comprising a bell crank having a load supporting arm and a balance arm angularly disposed thereto, means mounting said bell crank for rocking movement about a first fixed axis, counterbalance mechanism comprising a spring assembly connected to said balance arm, and guide means carried in part by said balance arm and in part by said spring assembly to rock said spring assembly about a second fixed axis spaced from but parallel to said first axis in accordance with rocking movement of said bell crank, said spring assembly comprising a first spring seat mounted for rocking movement about said second axis, a second spring seat spaced from said first spring seat, a helical spring between said seats, a rod connecting said second spring seat to said balance arm, said first spring seat having a projection thereon provided with an elongated guide slot, and a guide element carried by said balance arm slidable in said slot.

24. A constant load support comprising a load supporting arm mounted for swinging in a vertical plane about a first horizontal axis, means on said load supporting arm for supporting a load at a constant radial distance from the pivot axis, a balance arm angularly displaced from said load supporting arm and rigidly connected thereto for swinging movement in a vertical plane about said first axis, spring mechanism comprising a guide member mounted for rocking movement in a vertical plane about a second horizontal axis spaced from the vertical plane passing through said first axis, a compression spring seated at one end on said guide member and having its axis intersecting said second axis, a rod coaxial with said spring and pivotally connected at one end to said balance arm and slidable longitudinally of said guide member, a head on the other end of said rod against which the other end of said spring is seated, said guide member having a slot therein in alignment with said second axis, and the pivot connection between said rod and said balance arm comprising a pivot member slidable in the slot to effect positive rocking movement of said guide member upon rocking of said balance arm.

25. A constant load support comprising a load supporting arm mounted for swinging in a vertical plane about a first horizontal axis, means on said load supporting arm for supporting a load at a constant radial distance from the pivot axis, a balance arm angularly displaced from said load supporting arm and rigidly connected thereto for swinging movement in a vertical plane about said first axis, spring mechanism comprising a guide member mounted for rocking movement in a vertical plane about a second horizontal axis spaced from the vertical plane passing through said first axis, a compression spring seated at one end on said guide member and having its axis intersecting said second axis, a rod coaxial with said spring and pivotally connected at one end to said balance arm and slidable longitudinally of said guide member, a head on the other end of said rod against which the other end of said spring is seated, the angle between said arms being substantially equal to the angle between the vertical plane passing through said first axis and a second plane passing through both of said axes.

References Cited in the file of this patent

UNITED STATES PATENTS

| | | |
|---|---|---|
| 1,937,135 | Wood | Nov. 28, 1933 |
| 2,256,784 | Wood | Sept. 23, 1941 |
| 2,395,730 | Farkas | Feb. 26, 1946 |
| 2,535,305 | Loepsinger | Dec. 26, 1950 |
| 2,568,149 | Grabe | Sept. 18, 1951 |